(12) United States Patent
Baeuerle et al.

(10) Patent No.: US 10,704,457 B2
(45) Date of Patent: Jul. 7, 2020

(54) SUPERCHARGER OF AN INTERNAL COMBUSTION ENGINE WITH A DIAPHRAGM HAVING AN ELECTRICAL ACTUATOR CONTROLLED RESONANT FREQUENCY

(71) Applicant: Robert Bosch GmbH, Stuttgart (DE)

(72) Inventors: Michael Baeuerle, Eberdingen (DE); Michael Nau, Dornhan/Aischfeld (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 15/759,110

(22) PCT Filed: Jul. 20, 2016

(86) PCT No.: PCT/EP2016/067278
§ 371 (c)(1),
(2) Date: Mar. 9, 2018

(87) PCT Pub. No.: WO2017/041949
PCT Pub. Date: Mar. 16, 2017

(65) Prior Publication Data
US 2019/0048787 A1 Feb. 14, 2019

(30) Foreign Application Priority Data

Sep. 10, 2015 (DE) .................. 10 2015 217 340

(51) Int. Cl.
*F02B 33/02* (2006.01)
*F04B 35/04* (2006.01)
(Continued)

(52) U.S. Cl.
CPC .............. *F02B 33/02* (2013.01); *F02B 29/00* (2013.01); *F02B 33/32* (2013.01); *F02B 33/42* (2013.01);
(Continued)

(58) Field of Classification Search
CPC .......... F02B 33/32; F02B 33/42; F02B 29/00; F04B 43/00–0736; F04B 45/04–0536
See application file for complete search history.

(56) References Cited

U.S. PATENT DOCUMENTS

| | | | |
|---|---|---|---|
| 5,403,164 A | * | 4/1995 | Gama ................ F02B 33/06 123/70 R |
| 6,536,384 B1 | * | 3/2003 | Keoppel ............. F02B 33/06 123/70 R |

(Continued)

FOREIGN PATENT DOCUMENTS

| | | |
|---|---|---|
| DE | 1 003 503 B | 2/1957 |
| DE | 31 31 805 A1 | 3/1983 |

(Continued)

OTHER PUBLICATIONS

International Search Report corresponding to PCT Application No. PCT/EP2016/067278, dated Oct. 25, 2016 (German and English language document) (7 pages).

*Primary Examiner* — Laert Dounis
(74) *Attorney, Agent, or Firm* — Maginot, Moore & Beck LLP

(57) ABSTRACT

A supercharger for an internal combustion engine includes a supercharger chamber, a diaphragm, an inlet valve, an outlet valve, an exhaust gas line, and an actuator. The diaphragm is positioned in the supercharger chamber and divides the supercharger chamber into an intake chamber and an exhaust gas chamber. The inlet valve and outlet valve are positioned on the intake chamber. The exhaust gas chamber is connected to the exhaust gas line, and to the actuator. The actuator is electrically actuatable, is connected to the diaphragm, and is configured to change a resonance frequency of the diaphragm.

15 Claims, 3 Drawing Sheets

(51) Int. Cl.
　　　*F04B 45/047*　　(2006.01)
　　　*F02B 33/32*　　　(2006.01)
　　　*F02B 29/00*　　　(2006.01)
　　　*F02B 33/42*　　　(2006.01)

(52) U.S. Cl.
　　　CPC .......... *F04B 35/045* (2013.01); *F04B 45/047*
　　　　　　　　　　　(2013.01); *Y02T 10/146* (2013.01)

(56) References Cited

U.S. PATENT DOCUMENTS

| | | | |
|---|---|---|---|
| 7,270,110 B2 * | 9/2007 | Keoppel | F02M 35/10321 |
| | | | 123/317 |
| 8,826,646 B2 * | 9/2014 | Waletzek | F04B 35/045 |
| | | | 60/286 |
| 2006/0118070 A1 * | 6/2006 | Branston | F02B 25/14 |
| | | | 123/73 AF |
| 2016/0215684 A1 * | 7/2016 | Hofmann | F04B 43/0054 |
| 2018/0045192 A1 * | 2/2018 | Hofmann | F02B 29/00 |

FOREIGN PATENT DOCUMENTS

| | | |
|---|---|---|
| EP | 0 128 398 A1 | 12/1984 |
| EP | 2 846 019 A1 | 3/2015 |
| FR | 1031061 A | 6/1953 |
| FR | 2444819 A1 | 7/1980 |

\* cited by examiner

SUPERCHARGER OF AN INTERNAL COMBUSTION ENGINE WITH A DIAPHRAGM HAVING AN ELECTRICAL ACTUATOR CONTROLLED RESONANT FREQUENCY

This application is a 35 U.S.C. § 371 National Stage Application of PCT/EP2016/067278, filed on Jul. 20, 2016, which claims the benefit of priority to Serial No. DE 10 2015 217 340.2, filed on Sep. 10, 2015 in Germany, the disclosures of which are incorporated herein by reference in their entirety.

BACKGROUND

The present disclosure relates to a supercharger for charging an internal combustion engine, having a supercharger chamber which is divided in a gastight manner by a diaphragm.

Different configurations of superchargers are known from the prior art. For example, exhaust gas turbochargers in which charging air of an internal combustion engine is compressed by means of a compressor are known. In this case, the compressor is driven by means of exhaust gases from the internal combustion engine. As an alternative, electrical superchargers in which the compressor is driven by means of an electric motor are also known. However, exhaust gas turbochargers in particular are relatively sluggish at low rotation speeds. Electrical superchargers are relatively expensive and require additional electrical energy for operation. However, there is also a commercial requirement to charge relatively small internal combustion engines, having one or two cylinders, with fresh air in order to obtain the known advantages in respect of consumption and torque. However, small internal combustion engines of this kind require in particular a cost-effective and robust supercharger.

SUMMARY

The supercharger according to the disclosure of an internal combustion engine has the advantages of very cost-effective production and very simple design over said prior art.

Furthermore, the supercharger according to the disclosure is very robust and suitable for use in small internal combustion engines in particular. Furthermore, a very high level of dynamics of the supercharger can be achieved according to the disclosure since synchronous-cycle boost pressure build-up is possible. In this case, the supercharger according to the disclosure has a high charging potential. In comparison to exhaust gas turbochargers, the supercharger according to the disclosure further has the advantage that there is no increase in an exhaust gas counterpressure and therefore a very good degree of system efficiency can be achieved. In this case, the supercharger according to the disclosure further exhibits only low mechanical friction losses too. According to the disclosure, this is achieved in that the supercharger for charging has a supercharger chamber and a diaphragm which is arranged in the supercharger chamber. The diaphragm subdivides the supercharger chamber into an intake chamber and an exhaust gas chamber, said chambers being separated from one another in a gastight manner by the diaphragm. An inlet valve and an outlet valve for fresh air are arranged on the intake chamber. The exhaust gas chamber is connected to an exhaust gas line. An electrically operable actuator which is connected to the diaphragm in the supercharger chamber is further provided. In this case, the electrical actuator changes a resonant frequency of the diaphragm. As a result, the resonant frequency of the diaphragm can be matched to the respectively existing operating states of the internal combustion engine, so that fresh air can be supplied to the internal combustion engine in an optimum manner.

The claims describe preferred developments of the disclosure.

The actuator preferably comprises an electrically operable electrical spring element, it being possible to vary the spring stiffness of said electrical spring element. According to the disclosure, an electrical spring element is understood to mean a spring system which can be electrically influenced in this case. The spring system which can be electrically influenced preferably comprises a diaphragm spring and a permanent-magnet spring connected in parallel or a diaphragm spring and a solenoid spring connected in parallel. As a result, a resonant frequency of the diaphragm can be changed in a simple and reliable manner.

Therefore, according to the disclosure, the resonant frequency of the diaphragm is changed in order for the resonant frequency of the diaphragm to track a state of an internal combustion engine. In this case, the resonant frequency of the diaphragm particularly preferably tracks the combustion cycle of the internal combustion engine. In this case, tracking of the resonant frequency of the diaphragm is preferably performed in such a way that the diaphragm oscillates at the resonance point or close to the resonance point, preferably in a range of ±20%, in particular ±10%, of the resonance point.

Since the resonant frequency of the diaphragm changes as the respective operating conditions of the internal combustion engine change, a control unit preferably enables the resonant frequency of the diaphragm to be deliberately changed in order to allow said diaphragm to oscillate as close as possible to its resonant frequency. Energy or power consumption at or close to the resonance point of the diaphragm can then be at a maximum here. Since a resonant frequency of a spring-mass oscillator is proportional to a root of a quotient of a spring constant in relation to an oscillating mass $(D/m)^{0.5}$, a stiffness of the electrical spring element varies since a mass of the oscillation system according to the disclosure, comprising the diaphragm, is constant.

The electrical spring element particularly preferably comprises an armature and at least one coil, wherein the armature is connected to the diaphragm. Therefore, a movement response of the armature can be influenced by applying current to the coil, as a result of which a stiffness of the electrical spring element can be varied. The higher the current, the higher the spring action. At both dead centers of the diaphragm and, respectively, of the armature, the restoring force increases, corresponding to a relatively high spring stiffness. Therefore, the resonant frequency increases as the application of current increases.

The electrical spring element particularly preferably comprises a stationary permanent-magnet element, in particular a permanent-magnet sleeve, and a short-circuiting element, which can be displaced in an axial direction of the actuator, in particular a short-circuiting sleeve. In this case, the short-circuiting element serves for the purpose of changing a magnetic flux by a position of the short-circuiting element relative to the permanent-magnet element of the electrical spring element being varied. Therefore, when current is applied to the coil, a position of the short-circuiting element is varied, so that an ability of an armature to move relative to the short-circuiting element changes since a magnetic flux through the armature has changed. Therefore, a different oscillation response of the diaphragm which is connected to the armature can be achieved. This design is particularly simple and cost-effective and, in particular, requires little maintenance in this case.

The actuator preferably displaces the short-circuiting element only between a first and a second extreme position. As a result, very simple, cost-effective and robust control of the actuator can be achieved.

Furthermore, current is preferably applied continuously to the coil of the actuator during operation. This likewise permits simple control of the actuator. In this case, the position of the short-circuiting element is preferably changed by changing an intensity with which current is applied to the actuator.

According to an alternative refinement of the present disclosure, the control unit is designed to apply current cyclically to the coil. In this case, cyclical current application particularly preferably follows a cyclical combustion process of the internal combustion engine. As a result, the oscillation response of the diaphragm can be stiffer or more elastic and therefore a different oscillation response can be set in a targeted manner in each case. In the process, the cyclical current application is selected in such a way that the oscillation response is as close as possible to the resonant frequency at the present operating time of the internal combustion engine.

According to a further preferred refinement of the disclosure, the control unit is designed to apply current constantly to the coil of the electrical spring element and to superimpose a cyclical current application operation on the constant current application operation. As a result, the resonant frequency of the diaphragm can be matched in a particularly accurate manner to the operating states respectively prevailing in the internal combustion engine. In this way, the resonant frequency can be passed out of the exhaust gas tract as close as possible to the excitation frequency by a permanent current application component while, at the same time, the synchronous-cycle current component (superimposed direct current pulse) additionally excites the system in order to further increase the amplitude and therefore the pumping action of the diaphragm and therefore the charging pressure.

The control unit is preferably designed to apply current to the coil synchronously to an internal combustion engine cycle in order to change, in particular to increase, an oscillation amplitude of the diaphragm without influencing the resonant frequency. In this way, electrical energy is used not only for control purposes but also for charging purposes (diaphragm pump with electric drive).

The control unit is further preferably designed to operate the actuator in such a way that current is applied to the coil based on an ignition frequency of the internal combustion engine, or corresponds as far as possible to the ignition frequency of the internal combustion engine. In this way, the diaphragm can have an increasing stiffness as the ignition frequency increases and therefore can be matched to the changing operating conditions of the internal combustion engine. In a first approximation, a current which is supplied to the actuator is proportional to a square of a rotation speed of the internal combustion engine and the mass of the oscillation response in this case.

The control unit is further preferably designed to operate the actuator in such a way that current is applied to the coil based on a rotation speed of the internal combustion engine. Therefore, the resonant frequency is ascertained depending on the rotation speed of the internal combustion engine, and therefore very simple control of the actuator is possible.

For a refinement of the supercharger which is as cost-effective as possible, the inlet valve and/or the outlet valve for the fresh air are/is preferably in the form of non-return valves.

For improved robustness, the diaphragm is preferably provided in the form of a stainless steel diaphragm. As a result, high exhaust gas temperatures can also be permitted without damage to the supercharger according to the disclosure.

Signals of a crankshaft angle sensor which is usually present in any case are preferably used for the purpose of detecting a rotation speed of the internal combustion engine.

The electrical spring element particularly preferably comprises an electrical resonant circuit with a coil and a capacitor (LC resonant circuit). The LC resonant circuit preferably has a variable capacitance of the capacitor and/or a variable inductance of the coil. A plurality of capacitors which can be discretely switched and/or coil taps, which can be differently switched, on the coil are particularly preferably provided here. In this case, a resonant frequency of the LC resonant circuit preferably closely tracks an ignition frequency of the internal combustion engine. In particular, synchronous-phase current application to the electrical spring element can be performed by means of the LC resonant circuit. A movement phase of the diaphragm can be amplified in accordance with a current direction, for example by pulse-width-modulated DC current pulses. As an alternative, alternating current pulses with the same sense can also be used. Synchronization of the cyclical electrical assistance means can be performed, for example, by means of current sensing and/or by means of armature stroke sensing and/or based on a crankshaft angle. Since a crankshaft angle is usually precisely known in any case in a control unit of an internal combustion engine, control of the supercharger is preferably integrated in the control means of the internal combustion engine. Therefore, assistance and energy absorption of the diaphragm by the pressure waves in the exhaust gas system can be improved in a targeted manner since a resonant frequency of the diaphragm tracks the ignition frequency of the internal combustion engine as far as possible. Therefore, only a low amount of additional electrical energy is required.

The present disclosure further relates to an internal combustion engine, in particular to a small internal combustion engine with one or two or three cylinders, comprising a supercharger according to the disclosure. The internal combustion engine according to the disclosure is particularly preferably used in small vehicles, in particular two-wheeled vehicles or three-wheeled vehicles or quadbikes or snowmobiles or the like. In this case, the supercharger according to the disclosure can be used both in direct-injection internal combustion engines and also in intake manifold injection systems.

BRIEF DESCRIPTION OF THE DRAWINGS

Exemplary embodiments of the disclosure will be described in detail below with reference to the accompanying drawing. Identical or functionally identical parts are provided with the same reference symbols in said drawing, in which.

DETAILED DESCRIPTION

A supercharger 1 according to a first preferred exemplary embodiment of the disclosure will be described in detail below with reference to FIGS. 1 to 3.

Figure 1:
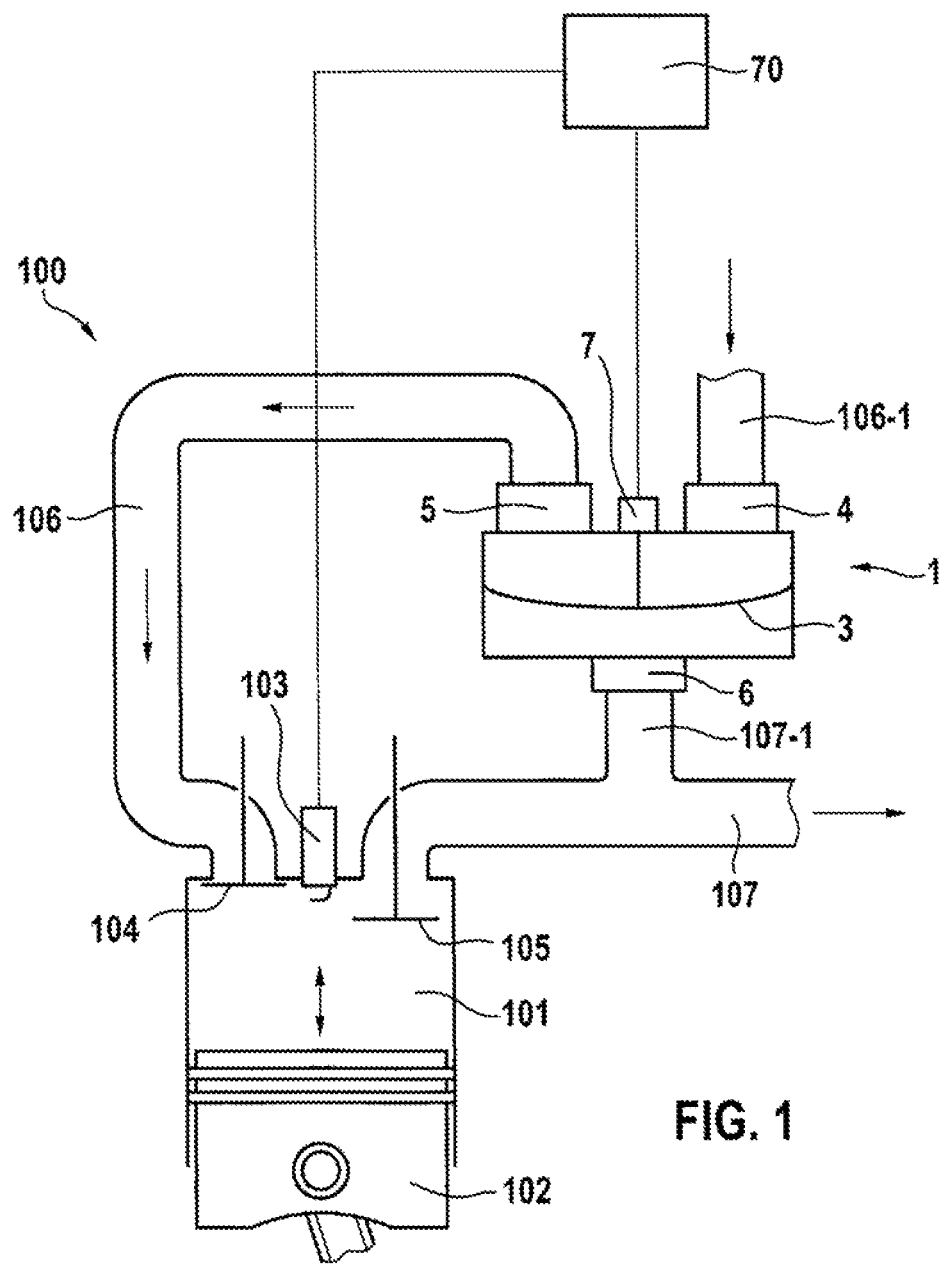
FIG. 1 shows a schematic view of an internal combustion engine having a supercharger according to the disclosure.

FIG. 1 schematically shows an internal combustion engine 100 which is a single-cylinder machine and has a combustion chamber 101 in which a piston 102 can move back and forth. Reference symbol 103 denotes a spark plug. Furthermore, a combustion chamber inlet valve 104 and a combustion chamber outlet valve 105 are arranged on the combustion chamber 101. A fresh air line 106 leads to the combustion chamber inlet valve 104. An exhaust gas line 107 continues from the combustion chamber outlet valve 105. In this case, fuel can be injected either into the fresh air supply line 106 (intake line) or directly into the combustion chamber 101.

The supercharger 1 according to the disclosure is now arranged in the fresh air line 106, as schematically shown in FIG. 1. In this case, fresh air is supplied to the supercharger 1 via the line section 106-1. Here, an inlet valve 4, which is in the form of a non-return valve, is provided at the mouth. Compressed fresh air is then passed via an outlet valve 5 into the fresh air line 106 and from there into the combustion chamber 101.

Figure 2:
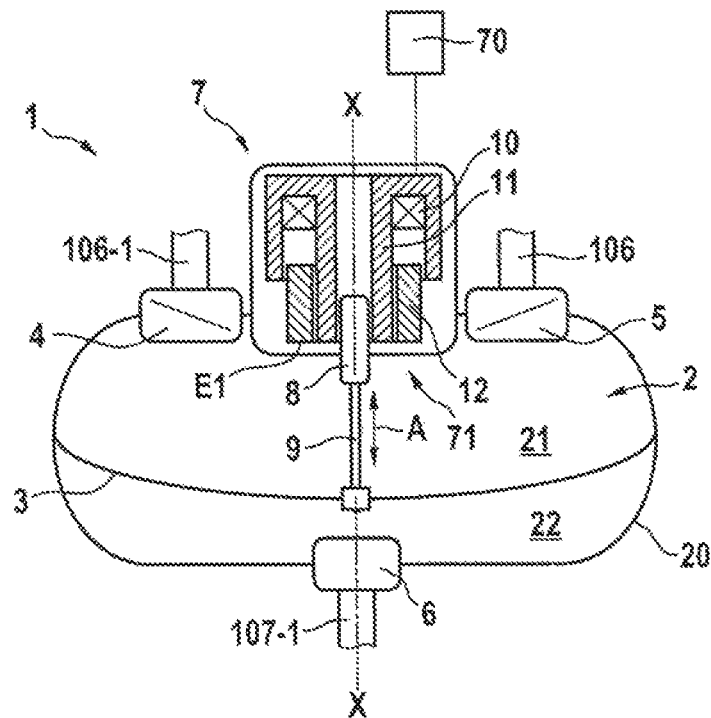
FIG. 2 shows a schematic view of the supercharger from FIG. 1 in a first operating state.
Figure 3:
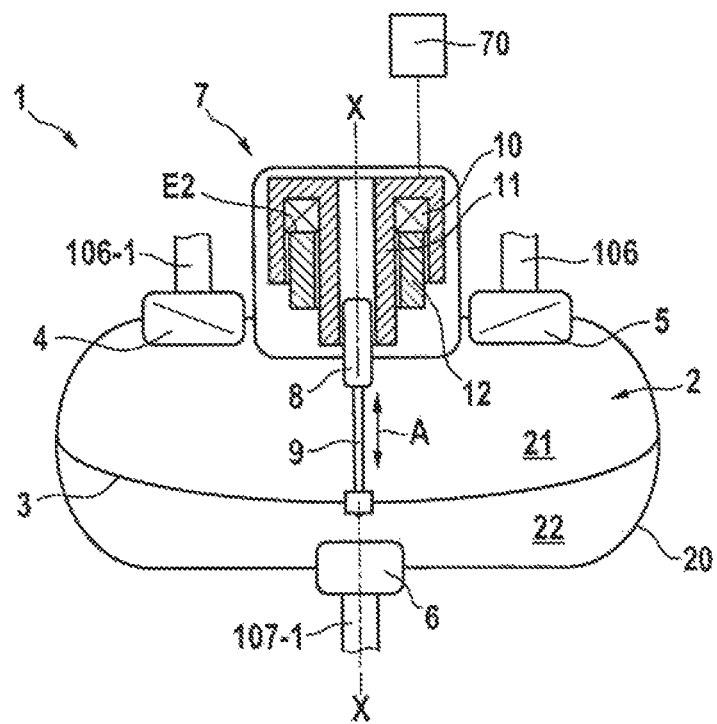
FIG. 3 shows a schematic view of the supercharger from FIG. 2 in a second operating state.

The supercharger 1 is illustrated in detail in FIGS. 2 and 3. As is clear from FIGS. 2 and 3, the supercharger 1 comprises a supercharger chamber 2 which has, in a housing 20, an intake chamber 21 and an exhaust gas chamber 22. The intake chamber 21 is separated from the exhaust gas chamber 22 in a gastight manner by a diaphragm 3. The diaphragm 3 is a stainless steel diaphragm and is fixed along its circumference to the inner wall region of the housing 20 in a gastight manner.

Furthermore, an electrically operable actuator 7 which comprises an electrical spring element 71 with an armature 8, a permanent-magnet sleeve 11 and a short-circuiting sleeve 12, is provided. The armature 8 is connected to the diaphragm 3 by means of a rod 9.

In this case, as is clear from FIGS. 2 and 3, the armature 8 is arranged in the interior of the permanent-magnet sleeve 11. In this case, the armature can be moved, as indicated by double-headed arrow A, in axial direction X-X of the actuator 7.

Furthermore, the short-circuiting sleeve 12 is arranged on the outer circumference of the permanent-magnet sleeve 11. The short-circuiting sleeve 12 can likewise be moved in axial direction X-X.

As is clear from FIGS. 1 to 3, the exhaust gas chamber 22 is connected to the exhaust gas line 107 by means of an exhaust gas line connection 6 and a line branch 107-1.

Furthermore, a control unit 70 which is designed to actuate the electrically operable actuator 7 is provided. The control unit 70 is further connected to the spark plug 103, as is clear from FIG. 1.

The functioning of the supercharger 1 according to the disclosure is as follows in this case. The exhaust gas chamber 22 of the supercharger 1 is connected to the exhaust gas line 107 by the line branch 107-1. As a result, exhaust gas pressure surges are transmitted to the diaphragm 3 by means of the exhaust gas chamber 22. The fresh air which is arranged in the intake chamber 21 is compressed in this way and is then pushed out into the fresh air line 106 via the outlet valve 5. Owing to the inherent elasticity of the diaphragm 3, said diaphragm automatically returns to its starting position again. In the process, fresh air is drawn from the line section 106-1, via the inlet valve, into the intake chamber 21.

In order to ensure as high as possible an energy absorption of the oscillation system which comprises the diaphragm 3 and the armature 8, the diaphragm 3 should oscillate as far as possible at its resonant frequency or in a range close to the resonant frequency, preferably +/−20% of the resonant frequency. According to the disclosure, a position of the short-circuiting sleeve 12 can then be changed by the actuator 7. A spring stiffness of the electrical spring element 71 is changed in this way.

As shown by comparing FIGS. 2 and 3, the short-circuiting sleeve 12 is arranged at its lower extreme point E1 close to the supercharger chamber 2 in FIG. 2 and at its upper extreme point E2 close to the coil 10 in FIG. 3. In this exemplary embodiment, the short-circuiting sleeve 12 can assume only two extreme positions, specifically a lower extreme position (FIG. 2) and an upper extreme position (FIG. 3). A magnetic flux from the permanent-magnet sleeve 11 across the armature 8 is varied owing to the change in position of the short-circuiting sleeve 12. As a result, an ability of the armature 8 to move is varied, so that a spring stiffness of the electrical spring element 71 is varied. As a result, a resonant frequency of the diaphragm 3 can be deliberately set by changing a position of the short-circuiting sleeve 12 and therefore an ability of the armature 8 to move.

The control unit 70 is then designed in such a way that, based on an ignition frequency which can be easily detected by means of the connection to the spark plug 103, a corresponding resonant frequency of the diaphragm 3 is also set. In this case, FIG. 2 shows a setting operation in such a way that, at a minimum rotation speed of the internal combustion engine, the electrical spring element 71 has a very low spring stiffness and therefore the diaphragm 3 has a low resonant frequency. In this case, a magnetic field is correspondingly weakened by the short-circuiting sleeve 12. FIG. 3 illustrates a setting operation of the actuator 7 at a maximum rotation speed of the internal combustion engine. Here, the electrical spring element 71 has a maximum spring stiffness and the diaphragm 3 has a high resonant frequency.

Therefore, more or less magnetic flux through the armature 8 can be set in a simple manner by changing a position of the short-circuiting sleeve 12, as a result of which a spring action of the electrical spring element 71 is varied. The armature 8 is likewise in the form of a permanent magnet.

Figure 4:
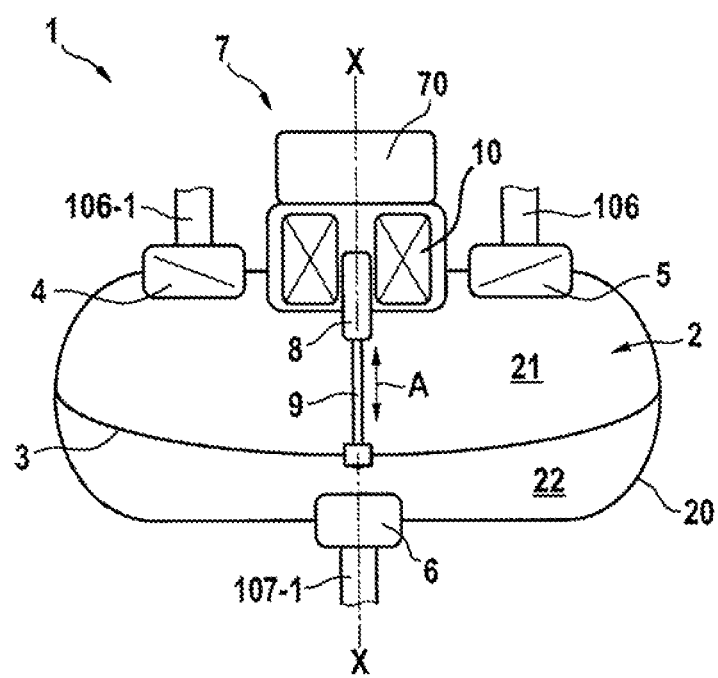
FIG. 4 shows a schematic view of a supercharger according to a second exemplary embodiment.

FIG. 4 shows a supercharger 1 according to a second exemplary embodiment of the disclosure. In this exemplary embodiment, a permanent-magnet armature 8 is arranged in the interior of the coil 10. Therefore, a spring stiffness of the electrical spring element 71 can be changed by applying current to the coil 10, this being controlled by means of the control unit 70. The armature 8 is again connected to the diaphragm 3 by means of the rod 9. Therefore, a resonant frequency of the diaphragm 3 can also be varied in a variable manner. Therefore, a different spring stiffness of the electrical spring element 71 and therefore different resonant frequencies of the diaphragm 3 are possible depending on the level of current application. Very fine setting of the resonant frequency of the diaphragm can be achieved in this case. The resonant frequency of the diaphragm is preferably determined depending on an ignition frequency. As an alternative or in addition, a rotation speed of the internal combustion engine is also ascertained and used for determining the resonant frequency of the diaphragm.

Here, the rotation speed can be ascertained, for example, by means of a crankshaft sensor which is usually present in internal combustion engines in any case. As a result, no additional components are required for ascertaining the rotation speed. Based on the rotation speed, the control unit 70 is then designed to apply current to the coil 10.

Furthermore, it is also possible for current to be applied continuously to the coil 10 and for a cyclical current application operation to be superimposed on the continuous current application in order to change the resonant frequency of the diaphragm 3.

It should once again be noted with respect to both exemplary embodiments that the control unit 70 is designed in such a way that the diaphragm 3 can always be operated in or close to a resonant frequency as far as possible during operation. As a result, energy absorption by means of the diaphragm is at the maximum, so that the exhaust gas surge can be used in an optimum manner for the purpose of compressing the fresh air in the intake chamber 21. It should further be noted that controlled valves can of course also be used instead of the inlet valves 4 and outlet valves 5 which are in the form of non-return valves. However, the costs of the supercharger 1 will be increased as a result of this.

The invention claimed is:

1. A supercharger for an internal combustion engine, comprising:
    a supercharger chamber,
    a diaphragm positioned in the supercharger chamber so as to subdivide the supercharger chamber into an intake chamber and an exhaust gas chamber;
    an inlet valve and an outlet valve positioned on the intake chamber;
    an exhaust gas line connected to the exhaust gas chamber; and
    an electrically operable actuator connected to the diaphragm, and configured to change a resonant frequency of the diaphragm.

2. The supercharger as claimed in claim 1, wherein the actuator includes an electrically operable electrical spring element with a variable spring stiffness.

3. The supercharger as claimed in claim 2, wherein the electrically operable electrical spring element has:
    an armature connected to the diaphragm; and
    a coil.

4. The supercharger as claimed in claim 3, wherein:
    the electrically operable electrical spring element further includes a stationary permanent-magnet element and a short-circuiting element positioned along an axial direction of the actuator, and configured to change a magnetic flux through the armature; and
    the actuator is further configured such that applying a current to the coil causes a position of the short-circuiting element to vary, in order to change a spring stiffness of the electrically operable spring element.

5. The supercharger as claimed in claim 4, wherein the actuator is configured to vary the position of the short-circuiting element only between a first extreme position and a second extreme position.

6. The supercharger as claimed in claim 3, further comprising:
    a control unit configured to control the actuator so that the diaphragm oscillates at a resonant frequency of the diaphragm or at a frequency in a range of +1-20% of the resonant frequency.

7. The supercharger as claimed in claim 6, wherein:
    the control unit is further configured to apply current constantly to the coil; or
    the control unit is further configured to apply current cyclically to the coil.

8. The supercharger as claimed in claim 6, wherein the control unit is further configured to apply current constantly to the coil and to superimpose a cyclical current on the constant current.

9. The supercharger as claimed in claim 6, wherein the control unit is further configured to apply current to the coil synchronously to an internal combustion engine cycle in order to change an oscillation amplitude of the diaphragm without influencing the resonant frequency.

10. The supercharger as claimed in claim 6, wherein the control unit is further configured to operate the actuator such that current is applied to the coil based on an ignition frequency of an internal combustion engine.

11. The supercharger as claimed in claim 6, wherein the control unit is further configured to operate the actuator such that current is applied to the coil based on a rotation speed of an internal combustion engine.

12. The supercharger as claimed in claim 1, wherein at least one of the inlet valve and the outlet valve is a non-return valve.

13. The supercharger as claimed in claim 1, wherein the diaphragm is a stainless steel diaphragm.

14. The supercharger as claimed in claim 6, wherein the control unit is further configured to control the actuator so that the diaphragm oscillates in a range of +/−10% of the resonant frequency.

15. The supercharger as claimed in claim 9, wherein the control unit is further configured to apply current to the coil synchronously to the internal combustion engine cycle in order to increase the oscillation amplitude of the diaphragm without influencing the resonant frequency.

\* \* \* \* \*

UNITED STATES PATENT AND TRADEMARK OFFICE
CERTIFICATE OF CORRECTION

PATENT NO. : 10,704,457 B2
APPLICATION NO. : 15/759110
DATED : July 7, 2020
INVENTOR(S) : Baeuerle et al.

Page 1 of 1

It is certified that error appears in the above-identified patent and that said Letters Patent is hereby corrected as shown below:

In the Claims

In Claim 6, at Column 8, Line 13, delete the text "+1-20%" between the words "of" and "of" and insert the text --+/-20%-- in its place.

Signed and Sealed this
Twenty-fourth Day of November, 2020

Andrei Iancu
*Director of the United States Patent and Trademark Office*